United States Patent [19]

Gambs et al.

[11] Patent Number: 4,739,163
[45] Date of Patent: Apr. 19, 1988

[54] POSITION LOCATING OPTICAL CODER UTILIZING OPTICAL FIBER

[75] Inventors: Paul Gambs, Ecully; Jacques Taillebois, Plaisir; Jean-Marie Renaud, Courbevoie; Jean-Claude Perrot, Montigny En Cormeilles, all of France

[73] Assignee: M.C.B., France

[21] Appl. No.: 810,721

[22] Filed: Dec. 19, 1985

[30] Foreign Application Priority Data

Dec. 21, 1984 [FR] France ................................. 84 19713

[51] Int. Cl.$^4$ ............................................. G01D 5/34
[52] U.S. Cl. .............................. 250/231 SE; 250/227; 340/347 P
[58] Field of Search ............. 250/231 SE, 237 G, 227; 340/347 P; 356/373-375

[56] References Cited

U.S. PATENT DOCUMENTS

| 4,430,566 | 2/1984 | Searle | 250/231 SE |
| 4,536,649 | 8/1985 | Kozai et al. | 250/231 SE |
| 4,604,725 | 8/1986 | Davies et al. | 250/231 SE |

FOREIGN PATENT DOCUMENTS 896092  5/1962 United Kingdom.
2071896 9/1981 United Kingdom.

OTHER PUBLICATIONS

Patent Abstract of Japan, vol. 5, No. 182, (P-90), [854], Nov. 20, 1981; & JP-A-56 111 415, and 416 (Tokyo Shibaura Denki K.K.), 03.09.1981, Resume.

Primary Examiner—Edward P. Westin
Attorney, Agent, or Firm—Antonelli, Terry & Wands

[57] ABSTRACT

A position locating optical coder is provided formed by a sensor which includes a reader, for reading a code carrying element a pivoting micromirror actuated under the control of the output of the reader and a self contained power supply source. A module is provided which comprises two light emitters, a second reader, a unit for processing the signals from the second reader, and a power supply source. In addition a bidirectional coupler and optical fiber transmitting devices serve to transfer the code pulses between the sensor and the module.

11 Claims, 2 Drawing Sheets

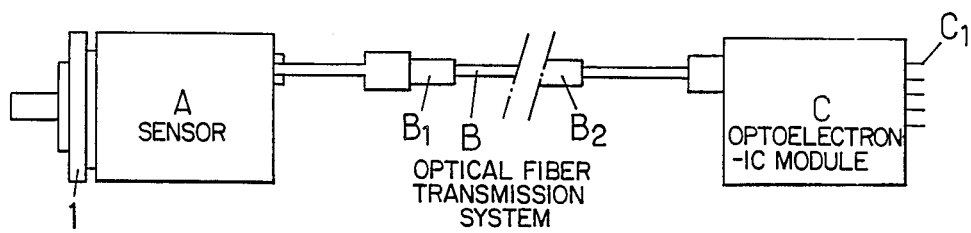
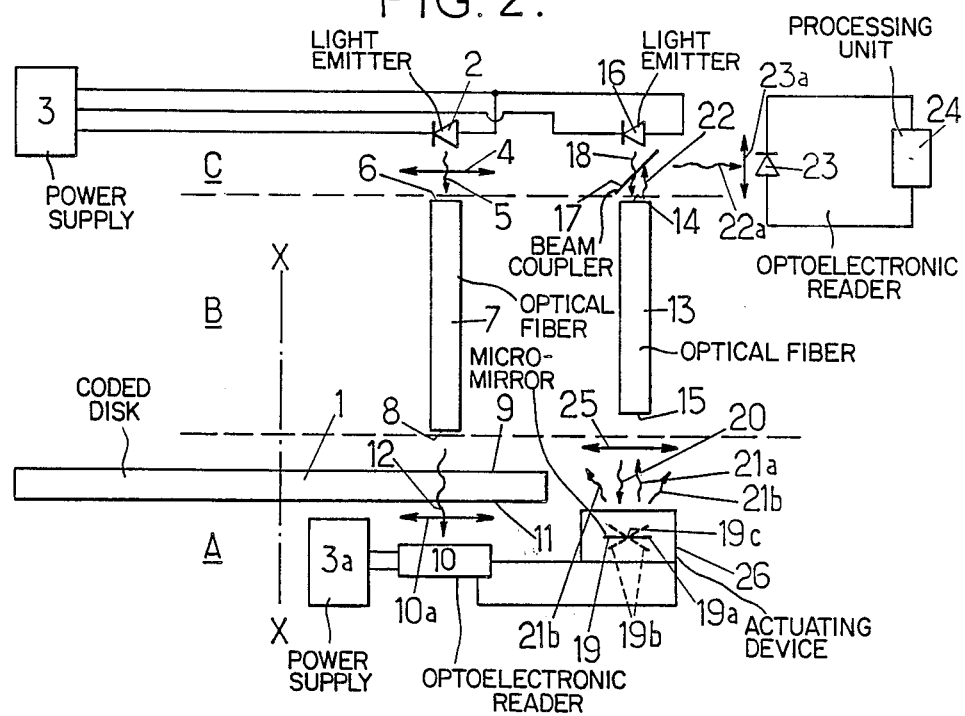

POSITION LOCATING OPTICAL CODER UTILIZING OPTICAL FIBER

BACKGROUND OF THE PRESENT INVENTION

The present invention relates to optical coders for locating by dioscopy the position of a mobile element.

It is known that such a coder comprises a disk or strip comprising several tracks, each with a succession of alternating opaque zones and transparent zones, and a reading assembly comprising a light source and one or more photodetectors which detect for each track whether an opaque zone or a transparent zone is present in front of the photodetectors(s); the disk or strip and the reading assembly are mobile with respect to each other either in rotation for, or in translation (for the strip). In addition, an electronic unit may be associated with the photodetector(s) for processing the signals emitted by the photodetector(s).

Generally, the assembly of this system is small, and when the components are distant from each other, conductors provide the electrical connections, for example, between the power supply means, the optoelectronic system forming the reading assembly and the electronic signal processing unit.

In some applications there exists a large distance between the reading assembly and the electronic signal processing unit. Any electric connection between these two units should be avoided because such a connection would risk being disturbed by outside interferences, particularly in the case of analog transmission of the signals between the reading unit and the electric signal processing unit.

SUMMARY OF THE PRESENT INVENTION

The present invention aims at providing an optical coder for locating by dioscopy the position of a mobile element distant from the electronic unit processing the signals which represent this position, while avoiding any outside interferences.

In accordance with the present invention, a position locating coder includes a data sensor which cooperates with the position code carrying elements comprising the optically coded tracks, an optoelectronic module with an electronic signal processing unit, and an optical bidirectional fiber transmission device.

The data sensor includes an optical reader for cooperating with the position code carrying element comprising the optically coded tracks which is disposed opposite the coded tracks for receiving the light passing through the transparent zones of said tracks and for transforming the light received into electric signals. A micro-mirror for modulating by reflection is included, and may pivot with respect to the optical transmission device about an active position, and sends light received back towards the optical transmission device. An actuating device causes the micro-mirror to pivot in response to the electric signals emitted by said optoelectronic reader, and a self contained supply source supplies the optoelectronic reader and the actuating device with power.

The optoelectronic module of the present invention comprises at least one optoelectronic light emitter and an optoelectronic reader, associated with a processing unit for processing electric signals emitted by the optoelectronic reader in response to light signals.

Furthermore, the coder includes at least one bidirectional optical beam coupler and the optical transmission means includes at least one optical fiber, cooperating with the bidirectional coupler, for applying the light emitted by the optoelectronic emitter(s) of the module to the optically coded tracks of the code carrying element and to the micro-mirror of the data sensor, and for applying the light reflected by the micro-mirror in its active position to said optoelectronic reader of the module.

An optical system may be disposed in front of the opto-electronic reader of the sensor and possibly in front of the opto-electronic reader of the module, or between each optoelectronic emitter and the optical fiber(s) transmitting the light emitted by this emitter.

The self contained supply source for the sensor is formed advantageously by an electric dry cell, a photovoltaic cell supplied with external light by an optical fiber, or a local power supply source by microgeneration.

The bidirectional coupler of the optical beam may be a semitransparent mirror.

In addition, in the optoelectronic module, two optoelectronic light emitter are provided which cooperate with at least one optical fiber of the transmission device. At least one of these optical fibers applies the light emitted by the first emitter to the coded tracks, and at least one other of these optical fibers cooperates with the bidirectional coupler, disposed between it and the second emitter, for applying the light emitted by the second emitter to the micro-mirror and for applying the light reflected by the micro-mirror in the active position to the reader of the module.

The invention will in any case be well understood from the complement of the description which follows and from the accompanying drawings.

BRIEF DESCRIPTION OF THE DRAWINGS

FIG. 1 illustrates schematically the whole of the optical position locating coder of the present invention, showing its three constituent units, namely the sensor, the optical transmission device and the module.

FIG. 2 illustrates the components of the three units illustrated in FIG. 1.

DESCRIPTION OF THE PREFERRED EMBODIMENTS

Figure 3:
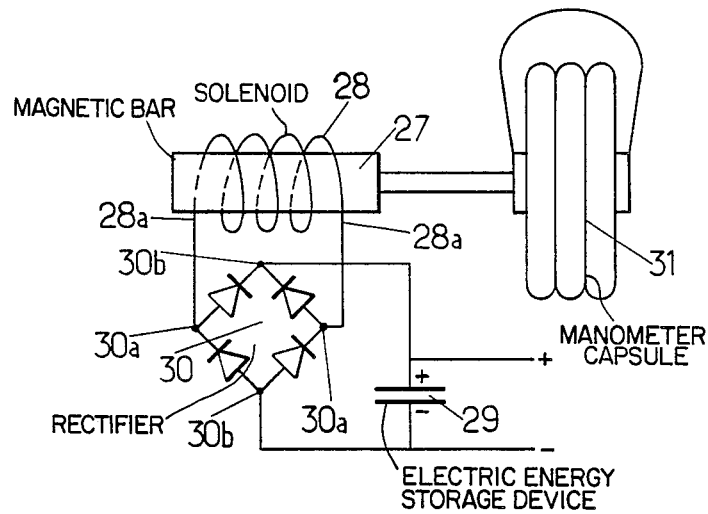
FIG. 3 illustrates the components of an embodiment of a power supply source used in the present invention.

The invention is described hereafter in a preferred embodiment applying to the location of an angular position. The mobile member, with axis X—X, comprising a coded disk 1 with several concentric coded tracks each with a succession of very find zones alternately opaque and transparent in the peripheral direction.

Referring more particularly to FIG. 2, in which the sensor A, the optical fiber light transmission system B, formed, for example, by an optical cable with two or more fibers, and the optoelectronic module C (assemblies A, B and C are shown in FIG. 1) have been separated by broken lines, it can be seen that the apparatus of the invention includes a first optoelectronic light emitter 2, formed, for example, by a light emitting diode and fed with power supply means 3, for example, external means formed by a general electricity source.

An optical system 4 forming, from the light emitted by the light emitter 2, a beam of rays 5 which converge on the input face 6 of a first optical fiber 7 whose output face 8 is disposed opposite one of the surfaces 9 of the coded disk 1, facing the coded tracks of this disk.

A first optoelectronic reader 10, disposed opposite the other surface 11 of the coded disk 1, transforms the light 12 received from the output phase 8 of the first optical fiber 7 through a transparent zone of disk 1 and made convergent thereon by an optical system 10a into electric pulses which control the actuating device 26 actuating a micro-mirror 19 as explained above. The optoelectronic reader 10 and the actuating means 26 are fed from a self contained source 3a formed, for example, by a dry cell, a photovoltaic cell supplied with external light by an optical fiber or a local power supply source by microgeneration. This latter source being advantageously formed by a system, shown in FIG. 3, comprising a solenoid 28 which surrounds a magnetic bar 25, a monometric capsule 31 for controlling the relative solenoid/magnetic bar movement in the system, a rectifier 30 whose input 30a is connected to the terminals 28a of the solenoid 28 and an electric energy storage device 29 (capacitor) connected to the output 30b of said rectifier means.

A second optical fiber 13 includes a first end 14 and a second end 15.

A second optoelectronic light emitter 16, similar to the first emitter 2, i.e. a light emitting diode, is fed from the same supply source 3 as the first emitter 2.

A bidirectional optical beam coupler, such as a transparent mirror 17 fixed in position, transmits at least part of the light 18 emitted by the second emitter 16 to the input end 14 of the second optical fiber 13.

A micro-mirror 19 is capable of oscillating about its axis 19c between two end positions 19b (shown with broken lines) while passing through an active position 19a (shown with continuous line) and reflects the light rays 20 received from the second emitter 16 (through the semitransparent element 17 and the fiber 13) in the form of reflected rays 21a which therefore pass through fiber 13 in the reverse direction. As rays 22 strike the semitransparent element 17, they are partly reflected as rays 22a. However, when micro-mirror 19 is in its other positions, such as 19b, the mirror 19 does not reflect back the rays 20 in direction 21a, but instead reflects in directions 21b, such that the rays are not received by the end 15 of the second optical fiber 13 and are, therefore not reflected by this semitransparent element 17 (they may, for example, be received by at least one black box forming a light trap).

Actuation device 26 (formed, for example, by control electrodes) acts on mirror 19 so as to cause it to pass from one end position 19b to the other end position 19b while passing through the active position 19a whenever the first optoelectronic reader 10 sends thereto an electric pulse.

A second optoelectronic reader 23 preceded by an optical system 23a (similar to the optical system 12) and formed for example by a photodetector, emits an electric pulse in response to a light pulse received and unit 24 processes the pulses produced by the reader 23.

The coder may also comprise an optical system between the second end 15 of the second optical fiber 13 and the micro-mirror 19 so as to adjust the light flow between the optical fiber 13 and mirror 19 in both directions of propagation, and an optical system (not shown), similar to the optical system 4, between the emitter 16 and the semitransparent mirror 17.

In particular, the micro-mirror 19 and the means 26 for actuating same may be formed by a reflecting aluminum micro-flap oscillating about its axis 19c, springs urging it normally into an endmost rest position 19b. When means 26 receives an electric pulse from the first reader 10 energized by the radiation 12, the mirror is urged so as to pass to the other endmost position 19b while passing through the active position 19a.

The reflecting micro-mirror and the associated control means may be formed, for example, as described in the published French patent application No. 2 478 352 filed Mar. 10, 1981 by "Centre Electronique Horloger S.A." to which the British Pat. No. 2 071 896 corresponds, which allows them to be obtained in the form of an element which may be controlled by pulses coming from the first reader 10 with reduced energy consumption.

Figure 4:
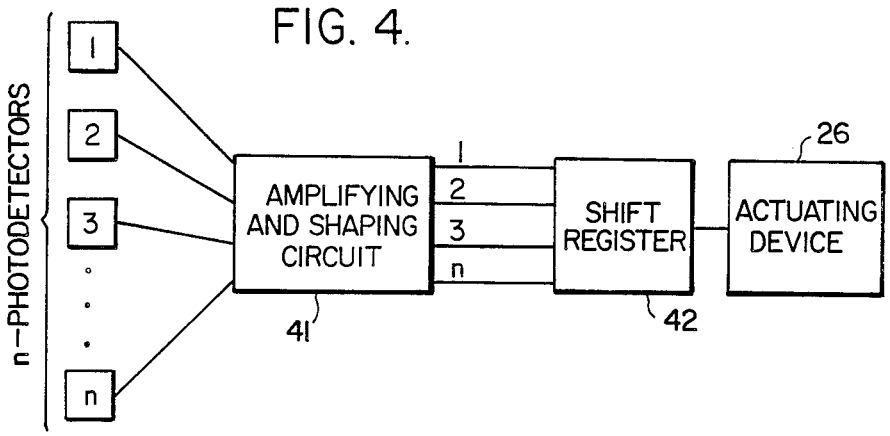
FIG. 4 illustrates an embodiment of an optoelectronic reader.

As shown in FIG. 4, the optoelectronic reader 10 may comprise several photodetectors 1-n (at least one per coded track on disk 1), an amplifying and shaping circuit 41 for the outputs of the photodetector(s) associated with each track, and a shift register 42 with parallel inputs (namely one input for each track) and a series output, this single output being connected to the actuating device 26 controlling the micro-mirror 19.

The electronic unit of the optoelectronic reader 10 is formed in accordance with technology allowing the reader to consume reduced electric energy, more particularly using a CMOS type technology.

This reader 10 will then deliver, for each reading, a group of electric pulses and absences of pulses, (in as many positions as there are coded tracks). An electric pulse corresponds to a transparent zone and an absence of pulse to an opaque zone of the track corresponding to the position in question.

The successive readings appear then as successive groups of pulses and absences of pulses, such a pulse, in response to a light pulse 12 passing through a transparent zone of disk 1, causing the micro-mirror 19 to pass to the position 19a, which causes a radiation 21a, which returns through the second optical fiber 13 and is partially reflected by the semitransparent element 17 as a light pulse 22a reaching the second reader 23 which in its turn emits an electric pulse. The successive electric pulses of reader 23 are processed in processing unit 24.

In FIG. 1, there have been shown the units of the sensor A with the coded disk 1, of the optical cable B forming the optical fiber transmission means and of module C with its output $C_1$ to the means using the output signals of module C, and the connectors $B_1$ and $B_2$ for connecting the optical cable B respectively with sensor A and the module C.

Operation of the coder of the invention comprises a first period for bringing it into service of the order of 0.5 to 1 second, in the case of photovoltaic current generation at 3a, but which may be of a different duration for another type of energy source.

This period of bringing into service is followed by a first work cycle comprising the activation of the two optoelectronic emitters 2 and 16 and of the first optoelectronic reader 10, followed by latching of the code in this region 10, the series transmission of the code by activation of mirror 19 (by the means 26) and of the second optoelectronic reader 23. This work period lasts about 2 ms.

Then a time for resting or recharging the energy source is provided which may be the order of 10 to 20 ms, at the end of which time a new work period may begin. The result is then that the work-rest cycle may begin again for example about every 12 to 22 ms.

It can be seen that the optical fibers 7 and 13 and the associated optoelectronic systems serve for remote transmission without risks of outside interferences, of the light is emitted by diodes 2 and 16. The fiber 13 also serving for the return of the light reflected by the micro-mirror 19 in position 19a.

The invention is in no way limited to those of its modes of the application and embodiments which have been particularly described, but embraces all variations thereof.

For example, the bidirectional coupler 17 could be replaced by two bidirectional couplers disposed, one between surface 8 of fiber 7 and disk 1 and the other between surface 15 of fiber 13 and the micro-mirror 19. Keeping coupler 17, another similar coupler could be provided between the emitter 2 and the face 6 of fiber 7. In these two variants using two bidirectional couplers, emitter 16 may be omitted and so a single emitter provided in module C.

Moreover, instead of providing as rest position for mirror 19 an end position 19b, on the contrary, position 19a could be provided as rest position for the mirror 19, the electric pulses generated by the radar 10 then acting on the actuating means or electrodes 26 for causing the mirror 19 to pivot from position 19a. In this case, an electric inverter may be provided between the output of the shift register of reader 10 and the actuating means or electrodes 26.

What is claimed is:

1. A position locating coder comprising:
   (a) a data sensor which cooperates with a position code carrying element comprising optically coded tracks;
   (b) an optoelectronic module including an electronic signal processing unit; and
   (c) optical fiber transmission means;
   (i) said data sensor comprising:
       a first optoelectronic reader disposed opposite said optically coded tracks for receiving light passing through transparent zones of said optically coded tracks and for transforming the light received into electric signals;
       a micro-mirror pivotable with respect to said optical fiber transmission means about an active position in which it sends back to said optical fiber transmission means light received therefrom;
       actuating means for causing said micro-mirror to pivot in response to said electric signals output by said first optoelectronic reader; and
       a first power supply source for supplying power to said first optoelectronic reader and said actuating means;
   (ii) said optoelectronic module comprising:
       at least one optoelectronic light emitter means and a second optoelectronic reader, associated with said processing unit, for detecting light emitted by said optoelectronic light emitter means after the light is reflected by said micro-mirror; and
       a second power supply source for supplying power to said optoelectronic emitter means and said second optoelectronic reader;
   (iii) said optical fiber transmission means comprising at least one optical fiber and at least one optical coupler for applying the light emitted by said optoelectronic light emitter means to said optically coded tracks of said position code carrying element, to said micro-mirror and to said second optoelectronic reader after said light has been reflected by said micro-mirror in its active position.

2. A position locating coder as claimed in claim 1, wherein said optoelectronic light emitter means comprises first and second optoelectronic light emitters and said optical fiber transmission means comprises first and second optical fibers, such that said first optical fiber applies the light emitted by said first light emitter to said coded tracks, and said second optical fiber applies the light emitted by said second light emitter to said micro-mirror and further applies the light reflected by said micro-mirror in its active position to said second optoelectronic reader.

3. A position locating coder as claimed in claim 1, wherein a first optical system is disposed in front of said first optoelectronic reader.

4. A position locating coder as claimed in claim 1, wherein at least one optical system is disposed between said at least one optoelectronic light emitter means and said optical fiber transmission means.

5. A position locating coder as claimed in claim 1, wherein said first optoelectronic reader comprises:
   at least one photodetector per optically coded track of said position code carrying element,
   a circuit for amplifying and shaping electric pulses output by said at least one photodetector in response to the light excitation of said at least one photodetector, and
   a shift register with one input per coded track and a single series output for driving said actuating means.

6. A position locating coder as claimed in claim 5, wherein said first optoelectronic reader is formed using a CMOS type technology.

7. A position locating coder as claimed in claim 1, wherein said first power supply source comprises an electric dry cell.

8. A position locating coder as claimed in claim 1, wherein said first power supply source comprises a photovoltaic cell.

9. A position locating coder as claimed in claim 1, wherein said first power supply source comprises a source of local power by microgeneration formed by a system comprising a solenoid which surrounds a magnetic bar, means for controlling relative solenoid and magnetic bar movement, rectifier means having an input connected to terminals of said solenoid and electric energy storage means connected to the output of said rectifier means.

10. A position locating coder as claimed in claim 1, wherein said micro-mirror comprises a reflecting microflap and an associated control means.

11. A position locating coder as claimed in claim 1, wherein a second optical system is disposed in front of said second optoelectronic reader.

* * * * *